G. O. LEOPOLD.
CLUTCH MECHANISM FOR POWER MACHINES.
APPLICATION FILED JAN. 25, 1916.

1,212,966.

Patented Jan. 16, 1917.
2 SHEETS—SHEET 2.

Inventor
George O. Leopold
by his Attorneys
Howsm & Howson

UNITED STATES PATENT OFFICE.

GEORGE O. LEOPOLD, OF PHILADELPHIA, PENNSYLVANIA, ASSIGNOR TO NORTH BRO'S. M'F'G. CO., OF PHILADELPHIA, PENNSYLVANIA, A CORPORATION OF PENNSYLVANIA.

CLUTCH MECHANISM FOR POWER-MACHINES.

1,212,966.  Specification of Letters Patent.  Patented Jan. 16, 1917.

Application filed January 25, 1916. Serial No. 74,250.

*To all whom it may concern:*

Be it known that I, GEORGE O. LEOPOLD, a citizen of the United States, residing in Philadelphia, Pennsylvania, have invented certain Improvements in Clutch Mechanism for Power-Machines, of which the following is a specification.

My invention relates to certain improvements in clutch mechanism for coupling a loose pulley to a shaft.

The invention is particularly adapted for use in connection with a drilling machine, especially those of small size, which are driven by power.

One object of the invention is to provide a simple and effective clutch for coupling a pulley to the shaft.

A further object of the invention is to provide mechanism for use in connection with drilling and like machines, in which the ordinary counter shaft and shifting mechanism are dispensed with.

A still further object of the invention is to provide means for coupling the pulley to the shaft by longitudinal movement of the clutch member.

Figure 1:
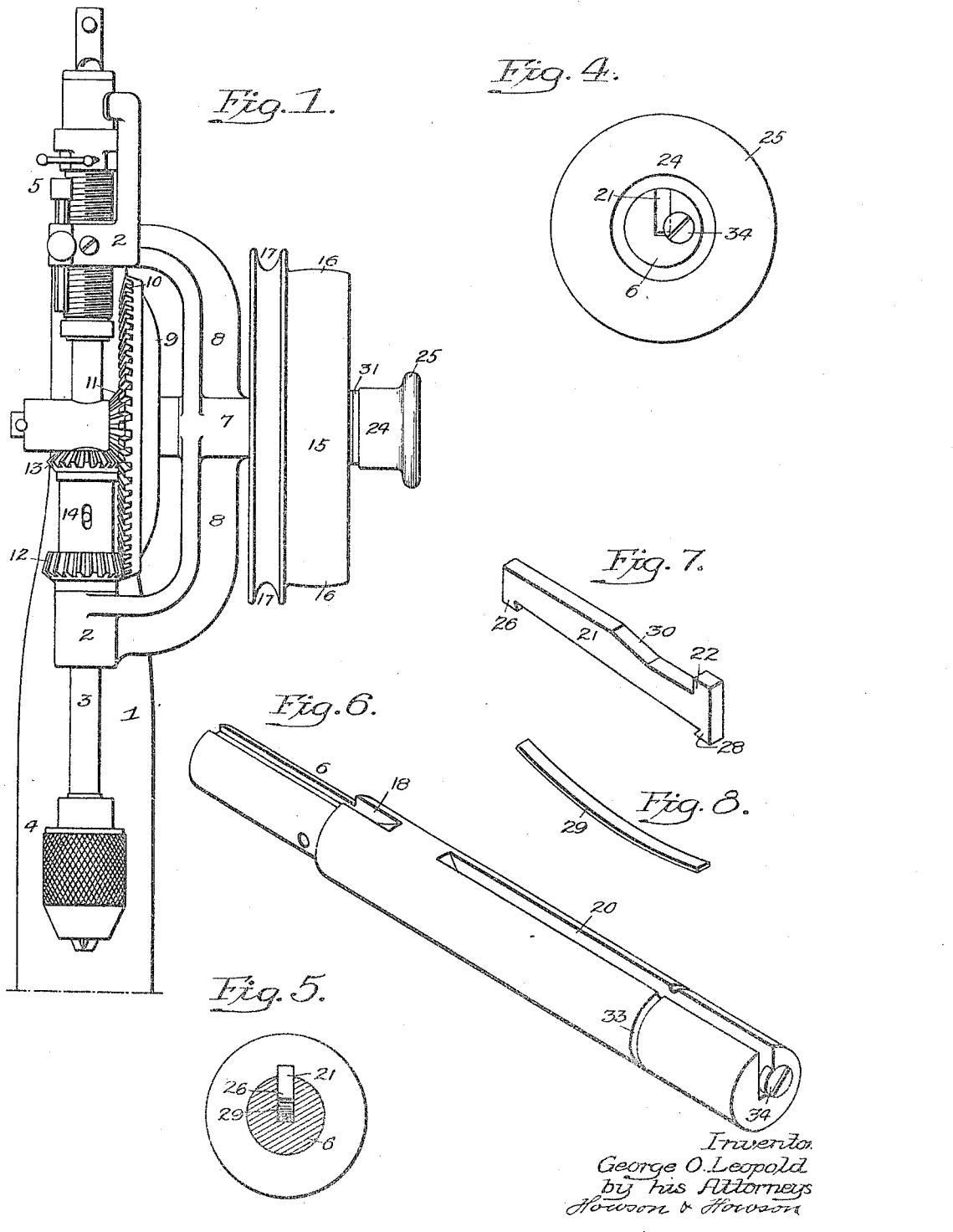
Figure 2:
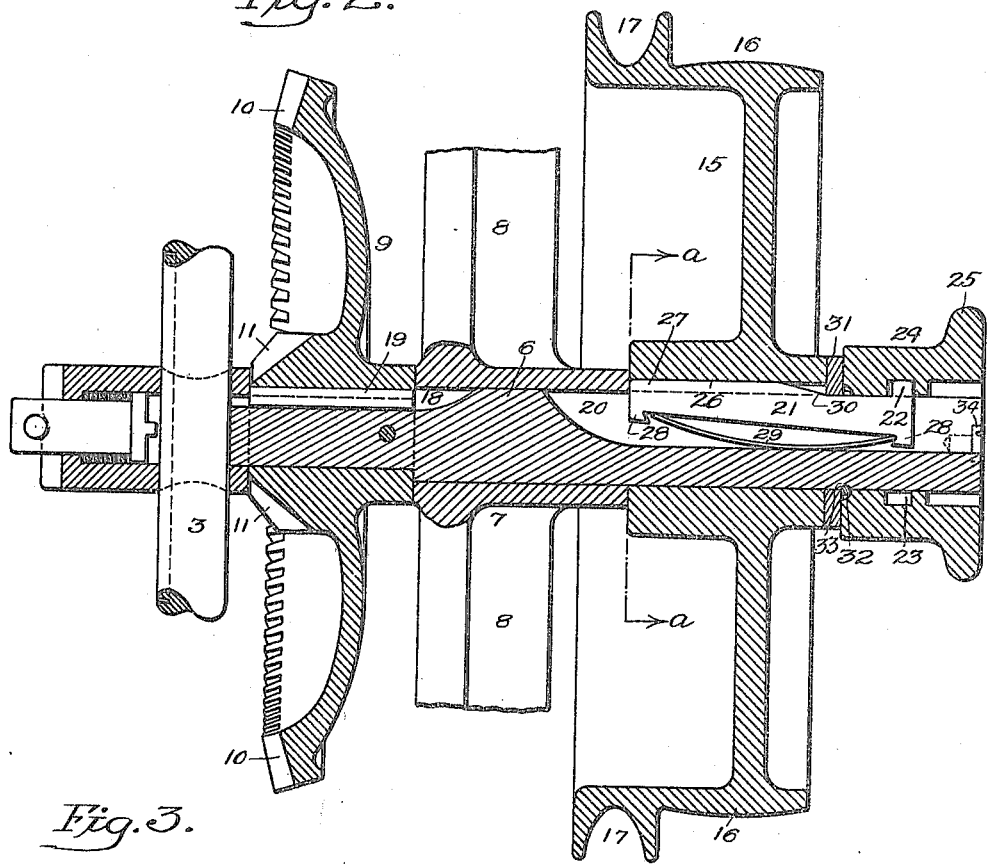
Figure 3:
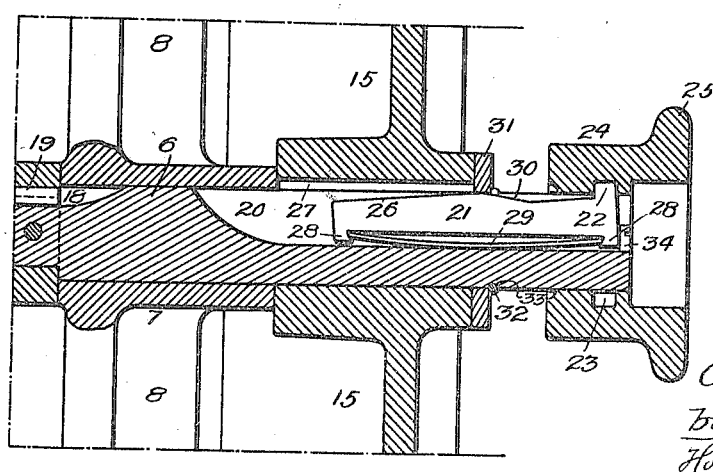

In the accompanying drawings: Figure 1 is a front view of my improved drilling machine, illustrating my invention; Fig. 2 is an enlarged sectional view through the pulley and shaft, showing the pulley clutched to the shaft; Fig. 3 is a view, similar to Fig. 2, showing the pulley disconnected from the shaft; Fig. 4 is an end view of a portion of Fig. 2; Fig. 5 is a sectional view on the line a—a, Fig. 2; Fig. 6 is a detached perspective view of the shaft; Fig. 7 is a detached perspective view of the key by which the pulley is coupled to the shaft; and Fig. 8 is a detached perspective view of the spring which bears against the key.

Referring to the drawings, 1 is the frame of the drilling machine.

2, 2 are bearings projecting from the frame.

3 is a spindle mounted in the bearings and having a chuck 4 at the lower end, in the present instance, and at the upper end of the machine is the feed mechanism 5.

6 is a transverse shaft mounted in bearings 7 in a bracket 8 projecting from the bearings 2 and mounted on this shaft is a beveled gear wheel 9 having two sets of gear teeth 10 and 11, which mesh with pinions 12 and 13 respectively which are arranged to be coupled to the spindle 3 through clutch mechanism 14 of any suitable type.

The above described mechanism forms no part of the present invention.

One end of the shaft is reduced, as shown, and on this end is located the gear wheel 9 and on the shaft at the opposite side of the bearing 7 is loosely mounted the driving pulley 15, in the present instance, having a face 16 for a flat belt and a groove 17 for a round belt. In the shaft 6 are two longitudinal grooves 18 and 20. A key 19 is located in the groove 18 and secures the gear wheel 9 to the shaft. The longitudinal groove 20 extends to the outer end of the shaft and located therein is a key 21 which has a lug 22 extending into a groove 23 in the sliding sleeve 24 having a hand hold 25. The portion 26 of the key is arranged to enter a slot 27 in the hub of the pulley 15 and when in this position the pulley is locked to the shaft and the shaft turns with the pulley, as illustrated in Fig. 2.

At each end of the key and at the under side thereof are undercut lugs 28 and between these lugs is a spring 29, tending to force the key 21 upward. This spring also prevents rattling of the key. The key has an inclined surface 30 located at one end of the part 26 and this surface, when the key is moved longitudinally, travels under the washer 31, which is located at the end of the hub of the pulley 15 and is held in position by a spring ring 32 located in a groove 33 in the shaft. The sleeve is loosely mounted on the shaft so that it can be grasped when the shaft is in motion and it has a limited longitudinal movement, as shown in Figs. 2 and 3, so as to shift the key 21. It is held from being entirely removed from the shaft by a screw 34 secured to the shaft. The head of the screw extends over the end of the slot 20 and in the path of the key 21, the key being connected to the sleeve 24 prevents the entire withdrawal of the sleeve, as illustrated in Fig. 3.

The operation is as follows: When the sleeve is pushed in against the washer 31, this action forces the key 21 to its full depth and the spring 29 yieldingly presses it against the hub and when the slot 27 registers with the key, the key is forced into the slot and the pulley is locked to the shaft, the shaft is driven by power, but, on withdrawing the sleeve to the position illustrated in Fig. 3, the key 21 is forced down by the washer 31 bearing upon the inclined surface 30 of the key and this causes the portion 26 of the key to be withdrawn from the slot 27 so that the pulley will turn loosely on the shaft.

I claim:

1. The combination of a bearing; a shaft mounted in the bearing and having a longitudinal slot therein; a washer on the shaft; means for holding the washer in position; a pulley loosely mounted on the shaft between the washer and the bearing and having a longitudinal slot therein arranged to aline with the slot in the shaft; a loose sleeve on the end of the shaft; a key mounted in the slot and engaged by the sleeve, said key having undercut projections at the back; a spring located between the two undercut projections and resting on the base of the slot of the shaft and tending to lift the key; a section of the upper surface of the key being inclined so that if the sleeve is pulled out, the key is withdrawn from engagement with the pulley by the inclined surface passing under the washer.

2. The combination of a shaft having a longitudinal slot therein; a pulley loosely mounted on the shaft and arranged to aline with the slot in the pulley; a key in the slot of the shaft arranged to extend into the slot of the pulley; a spring back of the key; means for depressing the key when said key is moved longitudinally; a sleeve loose on the shaft and having a hand hold by which it can be grasped, said sleeve having an internal groove therein, the key having a projection extending into the groove; and a screw located in the end of the shaft and having a head extending over the slot and forming a stop to limit the outward movement of the key and the sleeve.

GEORGE O. LEOPOLD.

Copies of this patent may be obtained for five cents each, by addressing the "Commissioner of Patents, Washington, D. C."